US011030296B2

(12) United States Patent
Qian (10) Patent No.: US 11,030,296 B2
(45) Date of Patent: Jun. 8, 2021

(54) LOGIN TO A SUSPENDED ACCOUNT (71) Applicant: Alibaba Group Holding Limited, George Town (KY)

(72) Inventor: Jianbo Qian, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 160 days.

(21) Appl. No.: 15/842,531

(22) Filed: Dec. 14, 2017

(65) Prior Publication Data

US 2018/0107819 A1 Apr. 19, 2018

Related U.S. Application Data (63) Continuation of application No. PCT/CN2016/086865, filed on Jun. 23, 2016.

(30) Foreign Application Priority Data

Jul. 1, 2015 (CN) .......................... 2015 1 0379975

(51) Int. Cl.
G06F 21/42 (2013.01)
G06F 16/245 (2019.01)
H04L 29/06 (2006.01)
G06F 21/34 (2013.01)
G06K 19/06 (2006.01)

(52) U.S. Cl.
CPC .......... *G06F 21/42* (2013.01); *G06F 16/245* (2019.01); *G06F 21/34* (2013.01); *G06K 19/06037* (2013.01); *H04L 29/06* (2013.01); *H04L 63/08* (2013.01); *H04L 63/20* (2013.01)

(58) Field of Classification Search
CPC ........ G06F 21/42; G06F 16/245; G06F 21/34; H04L 63/20; H04L 29/06; H04L 63/08; H04L 63/0815; G06K 19/06037
See application file for complete search history.

(56) References Cited

U.S. PATENT DOCUMENTS

2007/0198856 A1* 8/2007 Lee .................... G06F 21/79
713/190
2012/0240204 A1* 9/2012 Bhatnagar ........... H04L 63/0428
726/5

(Continued)

FOREIGN PATENT DOCUMENTS

CN          1855810        11/2006
CN          101009559      8/2007

(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.

(Continued)

*Primary Examiner* — Jeffrey D. Popham
(74) *Attorney, Agent, or Firm* — Fish & Richardson P.C.

(57) ABSTRACT

A first request to log in to a suspended account is received. The first request includes an operation code. A determination is made that the operation code satisfies a predetermined condition. In response to the determination, the suspended account is obtained based on the operation code and the suspended account is logged in to.

18 Claims, 5 Drawing Sheets

(56) References Cited

U.S. PATENT DOCUMENTS

| | | | |
|---|---|---|---|
| 2012/0257759 A1* | 10/2012 | Nick | H04L 9/0822 |
| | | | 380/286 |
| 2014/0195441 A1 | 7/2014 | Johnson | |
| 2015/0095984 A1* | 4/2015 | Adsule | H04L 63/083 |
| | | | 726/4 |
| 2016/0035021 A1 | 2/2016 | Lin | |
| 2016/0035321 A1 | 2/2016 | Cho et al. | |
| 2016/0072795 A1 | 3/2016 | Qin et al. | |

FOREIGN PATENT DOCUMENTS

| | | |
|---|---|---|
| CN | 104202169 | 12/2014 |
| CN | 104219196 | 12/2014 |
| CN | 104426844 | 3/2015 |
| JP | 2003345928 | 12/2003 |
| JP | 2007504560 | 3/2007 |
| KR | 20120100548 | 9/2012 |

OTHER PUBLICATIONS

Nakamoto, "Bitcoin: A Peer-to-Peer Electronic Cash System," www.bitcoin.org, 2005, 9 pages.
Extended European Search Report issued in EP Application No. 16817190.8-1213 dated May 22, 2018; 9 pages.
International Search Report issued by the International Searching Authority in International Application No. PCT/CN2016/086865 dated Sep. 13, 2016; 8 pages.
Search Report and Written Opinion of the Intellectual Property Office of Singapore issued in SG Application No. 11201710588V dated Sep. 10, 2018; 8 pages.
Written Opinion in Singaporean Patent Application No. 11201710588V, dated Nov. 18, 2019, 6 pages.

* cited by examiner

LOGIN TO A SUSPENDED ACCOUNT

This application is a continuation of PCT Application No. PCT/CN2016/086865, filed on Jun. 23, 2016, which claims priority to Chinese Patent Application No. 201510379975.4, filed on Jul. 1, 2015, and each application is incorporated by reference in its entirety.

BACKGROUND

A user can use an account number and a password to log in to a network account. If account security is at risk, the user can request to have the account suspended. Once the account is suspended, not even the user can log in to the account using the account number and the password.

SUMMARY

The present disclosure describes logging in to a suspended account.

In an implementation, a first request to log in to a suspended account is received. The first request includes an operation code. A determination is made that the operation code satisfies a predetermined condition. In response to the determination, the suspended account is obtained based on the operation code and the suspended account is logged in to.

Implementations of the described subject matter, including the previously described implementation, can be implemented using a computer-implemented method; a non-transitory, computer-readable medium storing computer-readable instructions to perform the computer-implemented method; and a computer-implemented system comprising one or more computer memory devices interoperably coupled with one or more computers and having tangible, non-transitory, machine-readable media storing instructions that, when executed by the one or more computers, perform the computer-implemented method/the computer-readable instructions stored on the non-transitory, computer-readable medium.

The subject matter described in this specification can be implemented in particular implementations, so as to realize one or more of the following advantages. First, the described approach can be used to enable logging in to a suspended account. For example, when a user reports a security risk associated with an online account, a server that manages the online account can verify the identity of the user, suspend the online account, and generate an operation code associated with the suspended online account. The operation code is transmitted to the user so that the user can use the operation code to log in to the suspended online account. Second, the described approach can provide security for the account. For example, after an online account is suspended, a malicious individual with a proper combination of account name and password information cannot log in to the online account. Third, an operation code can be used to communicate with the server, for example, using a texting message without a personal computer. Other advantages will be apparent to those of ordinary skill in the art.

The details of one or more implementations of the subject matter of this specification are set forth in the Detailed Description, the Claims, and the accompanying drawings. Other features, aspects, and advantages of the subject matter will become apparent to those of ordinary skill in the art from the Detailed Description, the Claims, and the accompanying drawings.

DESCRIPTION OF DRAWINGS

Like reference numbers and designations in the various drawings indicate like elements.

DETAILED DESCRIPTION

The following detailed description describes logging in to a suspended account, and is presented to enable any person skilled in the art to make and use the disclosed subject matter in the context of one or more particular implementations. Various modifications, alterations, and permutations of the disclosed implementations can be made and will be readily apparent to those of ordinary skill in the art, and the general principles defined can be applied to other implementations and applications, without departing from the scope of the present disclosure. In some instances, one or more technical details that are unnecessary to obtain an understanding of the described subject matter and that are within the skill of one of ordinary skill in the art may be omitted so as to not obscure one or more described implementations. The present disclosure is not intended to be limited to the described or illustrated implementations, but to be accorded the widest scope consistent with the described principles and features.

A user can open an account (such as, an online account) on a service platform (for example, WEIBO, TAOBAO, or online banking website). Normally, the user can log in to the account by input of login information, for example, an account number (also referred to as an account name) and a password. When account security is at risk (such as, the account number and the password are stolen), the user can request to have the account suspended, for example, by calling customer service associated with the service platform. Once the account is suspended, not even the user can log in to the account using the account number and the password.

At a high-level, the described approach provides a methodology permitting log in to a suspended account. When receiving, from a user, a request to suspend an account, a server that manages the account first verifies the identity of the user against the account. Once the identity of the user is verified, the server suspends the account. In addition, the server generates an operation code associated with the suspended online account. The operation code is transmitted to the user, so that the user can log in to the suspended account using the operation code instead of an account number and a password of the account. By denying access to the suspended account using the account number and the password, the suspended account is secured. In addition, the user can continue using the suspended account through use of using the operation code. As a result, user experience can be improved during an account suspension period.

Figure 1:
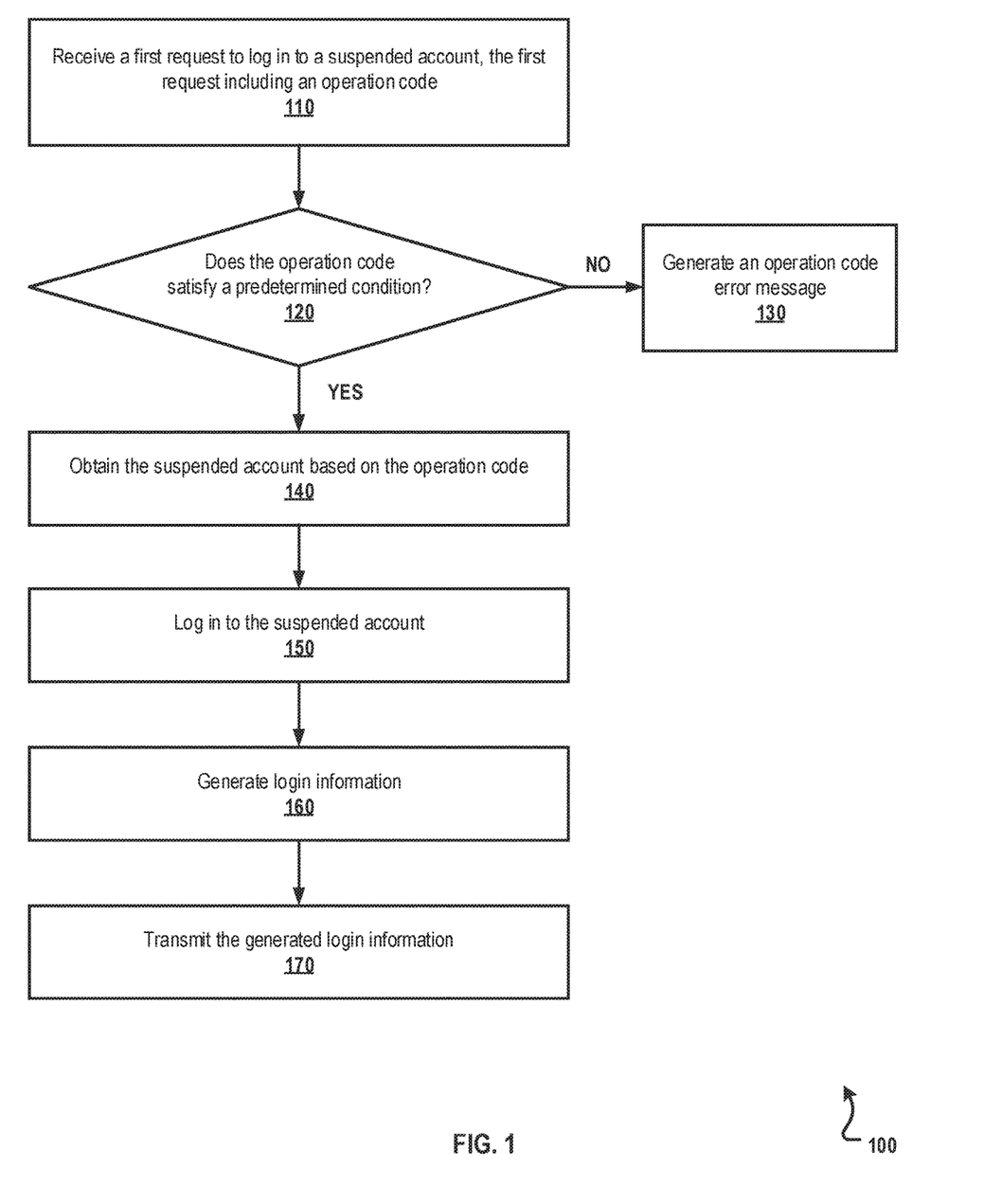
FIG. 1 is a flowchart illustrating an example of a computer-implemented method for login to a suspended account, according to an implementation of the present disclosure.

FIG. 1 is a flowchart illustrating an example of a computer-implemented method 100 for login to a suspended account, according to an implementation of the present disclosure. For clarity of presentation, the description that follows generally describes method 100 in the context of the other figures in this description. However, it will be understood that method 100 can be performed, for example, by any system, environment, software, and hardware, or a combination of systems, environments, software, and hardware, as appropriate. In some implementations, various steps of method 100 can be run in parallel, in combination, in loops, or in any order. In some implementations, one or more steps can also be omitted from the method 100.

Normally, network-based service providers provide Internet-based network services. A user can use a network service after a user computing device (that is, a user device) establishes a communication link with a server associated with the network service provider. For example, a network service provider can provide an online transaction platform, and a user can log in to an account associated with the online transaction platform using communication between a particular user device and an online transaction platform server. In some implementations, a network service provider provides a local area network based (LAN-based) network service or a network service that can be used on a single device. A user can use the LAN-based network service or the network service that can be used on a single device without a communication link between the user device and a server of the network service provider. Instead, the user can log in to an offline account using an offline account login unit included in the user device. For example, a network service provider provides an offline game, and a user can log in to an offline game account using an offline account login unit included in a game client installed on the user device.

At 110, a first request to log in to a suspended account is received. The first request includes an operation code. In some implementations, the first request does not include an account number or a password associated with the suspended account. For example, the first request is received by a server and from a client (for example, a user device). In some implementations, the first request is received by an offline account login unit included in a particular user device, for example, using a texting message. In some implementations, the client includes an application on a mobile phone or a computer, a login page on a browser, or an ATM machine. For an unsuspended account, a user can input an account number and a password associated with the unsuspended account using a user interface (for example, using an account input window graphical user interface (GUI)), and the client can transmit the input account number and password to the server to log in to the unsuspended account.

For a suspended account, a user is not permitted to input an account and a password for the suspended account. Instead, the user can input an operation code in the account input window or a new operation code input window, and the client can transmit the input operation code to the server to log in to the suspended account. In some implementations, the operation code can include at least one of a random number, a bar code, or a Quick Response (QR) code. For example, when the operation code includes a QR code, a user can easily upload an image of the QR code in the account input window or the new operation code input window using a camera associated with the client device, if present. When the operation code includes a random number, a user can input the random number (for example, using a keypad of an ATM machine). In some implementations, the operation code is generated when the account is suspended, as described in FIG. 2. From 110, method 100 proceeds to 120.

At 120, a determination is made as to whether the operation code satisfies a predetermined condition. If it is determined that the operation code does not satisfy the predetermined condition, method 100 proceeds to 130. Otherwise, if it is determined that the operation code satisfies the predetermined condition, method 100 proceeds to 140. In some implementations, the predetermined condition includes that the operation code is in an operation code table. For example, a server maintains an operation code table that stores multiple operation codes generated for multiple suspended accounts. When the server receives the operation code, the server automatically determines whether the received operation code is already stored in the operation code table. In some implementations, the predetermined condition includes that a number of the operation code being used to log in to the suspended account is less than a predetermined number. The predetermined number can be defined by the user. For example, if the predetermined number is set to 1, the operation code is automatically invalid after being used once to log in to the suspended account. The server can generate a new operation code when the operation code becomes invalid. If the predetermined number is set to a large number (for example, 9999), the operation code can be used for a long period of time.

At 130, an operation code error message is generated. For example, when the server determines that the operation code does not satisfy the predetermined condition (that is, the operation code is not a valid operation code), the server transmits an error message to the client indicating that the operation code is invalid. In some implementations, after 130, method 100 stops. In some implementations, from 130, method 100 proceeds to 110.

At 140, the suspended account is obtained based on the operation code. In some implementations, the server queries the operation table to obtain information associated with the suspended account based on the operation code. The information associated with the suspended account includes at least one of an account number or a password of the suspended account. In some implementations, when the operation code is generated by running a predetermined algorithm based on the information associated with the suspended account, the information associated with the suspended account can be obtained by running a revised algorithm of the predetermined algorithm based on the operation code. From 140, method 100 proceeds to 150.

At 150, the suspended account is logged in to. For example, the server can automatically log in to the suspended account based on the obtained account number of the suspended account. In some implementations, the server obtains a predetermined access right associated with the suspended account based on the operation code, and logs in to the suspended account with the predetermined access right. In some implementations, the predetermined access right can be defined by the user. For example, the predetermined access right only includes a right to unsuspend the suspended account. In some implementations, the predetermined access right only includes a right to check the suspended account. In some implementations, the predetermined access right includes all rights associated with the suspended account. From 150, method 100 proceeds to 160.

At 160, login information is generated. For example, once the server logs in to the suspended account, login information associated with the successful login can be generated automatically. In some implementations, the login information includes a predetermined access right associated with the suspended account. From 160, method 100 proceeds to 170.

At 170, the generated login information is transmitted. For example, the server transmits the generated login information to the client so that the client can log in to the suspended account. In some implementations, after 150, the server saves the suspended account login information, and the client proactively transmits another request to obtain the saved suspended account login information. As a result, the client can log in to the suspended account using the obtained login information. After 170, method 100 stops.

Figure 2:
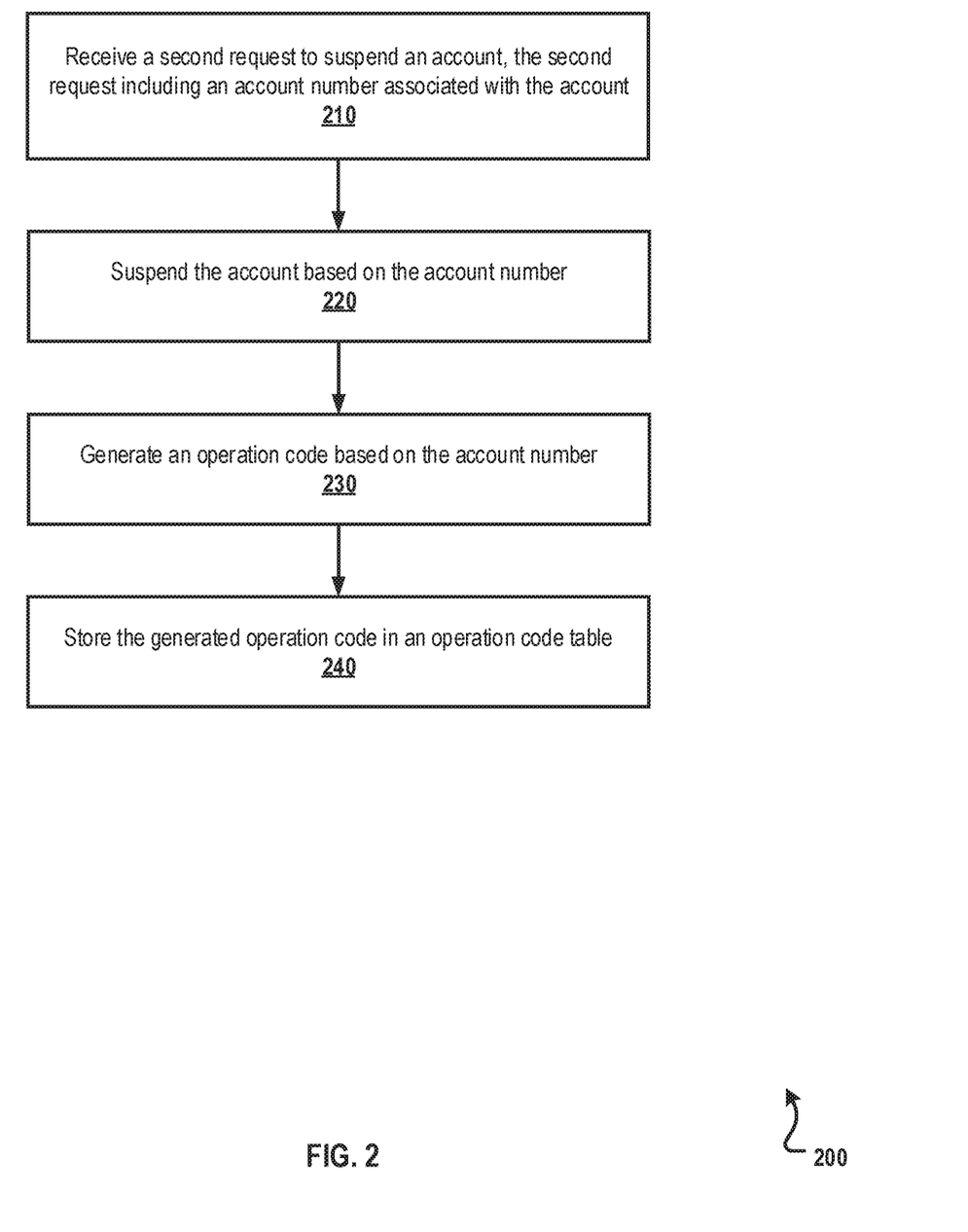
FIG. 2 is a flowchart illustrating an example of a computer-implemented method for generating an operation code, according to an implementation of the present disclosure.

FIG. 2 is a flowchart illustrating an example of a computer-implemented method 200 for generating an operation code, according to an implementation of the present disclosure. For clarity of presentation, the description that follows generally describes method 200 in the context of the other figures in this description. However, it will be understood that method 200 can be performed, for example, by any system, environment, software, and hardware, or a combination of systems, environments, software, and hardware, as appropriate. In some implementations, various steps of method 200 can be run in parallel, in combination, in loops, or in any order. In some implementations, one or more steps can also be omitted from the method 200.

At 210, a second request to suspend an account is received. The second request includes an account number associated with the account. For example, while using the account, a user notices that the account security is at risk (for example, the account has been accessed from an unidentified computing device), and transmits a request to suspend the account to a server that maintains the account. In some implementations, the user uses a loss report window associated with a client installed on a user device to transmit the request to the server. In some implementations, the client can be a software application or a login page rendered in a browser. In some implementations, the user can telephone customer service to request suspending the account on the server. From 210, method 200 proceeds to 220.

At 220, the account is suspended based on the account number. For example, the server verifies the identity of the user based on the account number. Once the identity of the user is verified, the server acquires the account based on the account number and suspends the account. After the account is suspended, the account cannot be logged in to using the account number and a password associated with the account. From 220, method 200 proceeds to 230.

At 230, an operation code is generated based on the account number. For example, the server can use a predetermined algorithm to generate a unique operation code for a particular account number. The predetermined algorithm includes a common encryption and data conversion algorithm. In some implementations, an operation code can be generated for multiple account numbers. For example, a user has multiple accounts, and each of the multiple accounts are suspended. The user can use a single operation code to log in to each and every account the user has without using different operation codes. From 230, method 200 proceeds to 240.

At 240, the generated operation code is stored in an operation code table. For example, the server can maintain an operation code table that stores all generated operation codes. In some implementations, the account number, a relationship between the generated operation code and the account number, or a combination of both are stored in the operation code table. After 240, method 200 stops.

Figure 3:
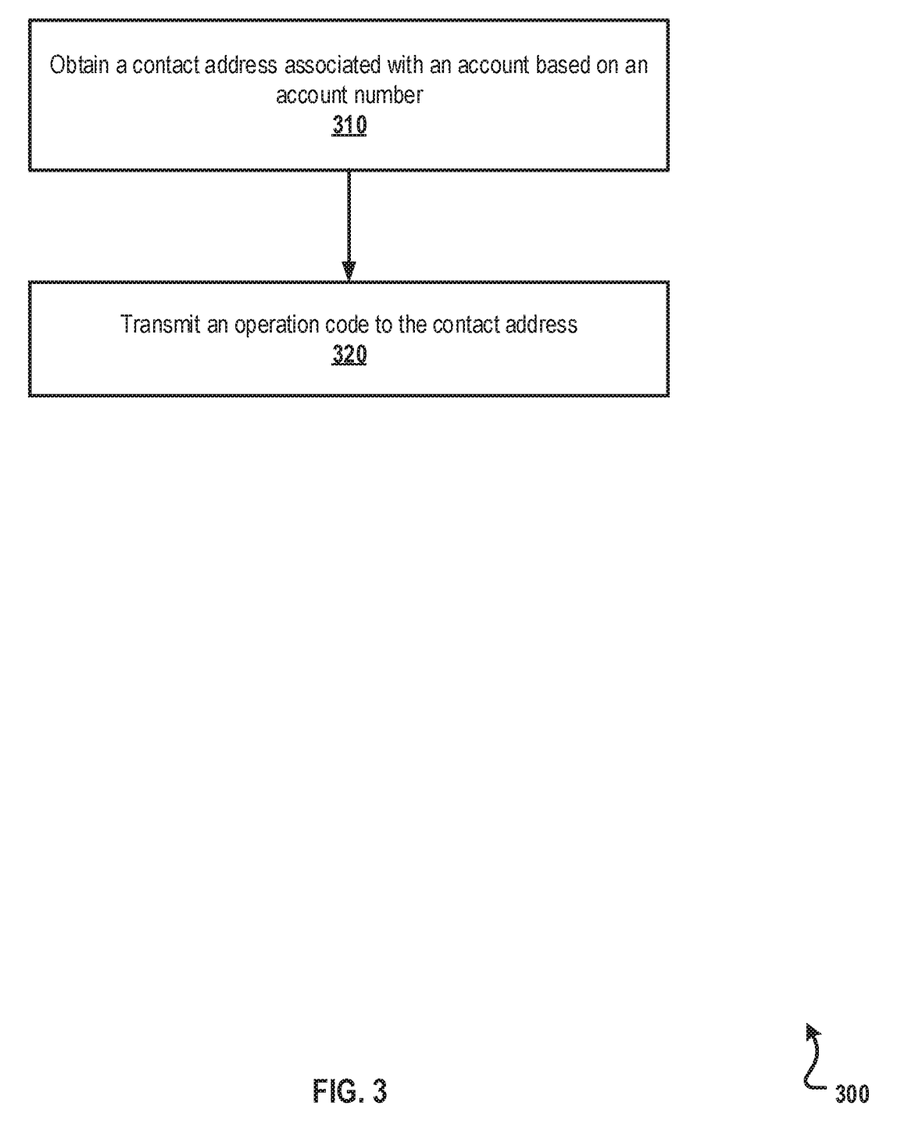
FIG. 3 is a flowchart illustrating an example of a computer-implemented method for transmitting an operation code, according to an implementation of the present disclosure.

FIG. 3 is a flowchart illustrating an example of a computer-implemented method 300 for transmitting an operation code, according to an implementation of the present disclosure. For clarity of presentation, the description that follows generally describes method 300 in the context of the other figures in this description. However, it will be understood that method 300 can be performed, for example, by any system, environment, software, and hardware, or a combination of systems, environments, software, and hardware, as appropriate. In some implementations, various steps of method 300 can be run in parallel, in combination, in loops, or in any order. In some implementations, one or more steps can also be omitted from the method 300.

At 310, a contact address associated with an account is obtained. The contact address is obtained based on an account number associated with the account. For example, when registering an account on a server, a user provides a contact address including at least one of a cell phone number, an email address, or an instant messaging account associated with the user. Based on an account number, the server can identify the account and the contact address associated with the account. From 310, method 300 proceeds to 320.

At 320, an operation code is transmitted to the contact address. For example, after user requests to suspend the account, the user receives at the contact address an operation code associated with the suspended account. The user keeps the operation code, and can log in to the suspended account using the operation code when needed. In some implementations, instead of receiving the operation code at the contact address, the user can query the server for the operation code based on the account number the user owns. After 320, method 300 stops.

Figure 4:
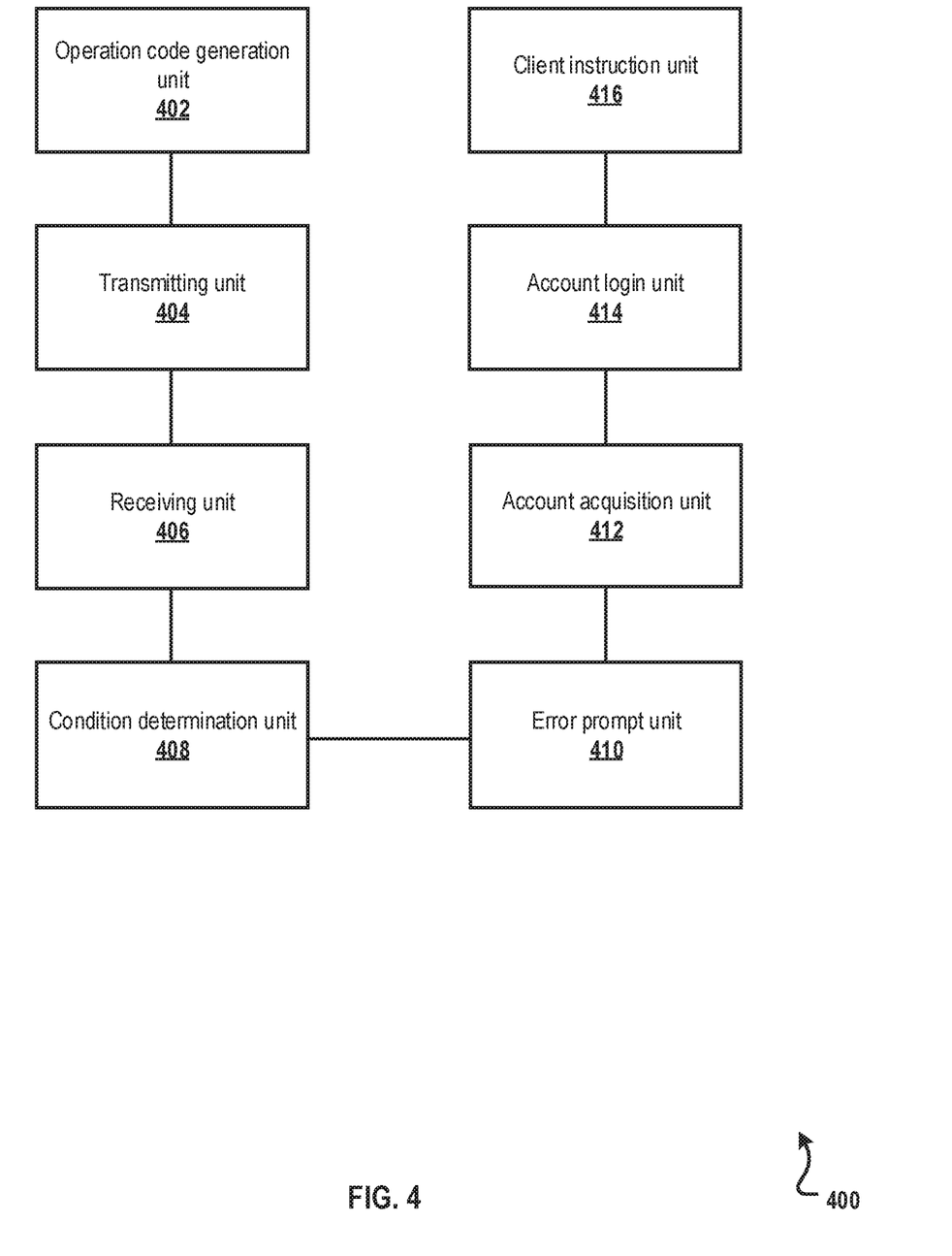
FIG. 4 is a block diagram illustrating an example of a data processing system for login to a suspended account, according to an implementation of the present disclosure.

FIG. 4 is a block diagram illustrating an example of a data processing system 400 for login to a suspended account, according to an implementation of the present disclosure. For clarity of presentation, the description that follows generally describes system 400 in the context of the other figures in this description. The system 400 can include an operation code generation unit 402, a transmitting unit 404, a receiving unit 406, a condition determination unit 408, an error prompt unit 410, an account acquisition unit 412, an account login unit 414, and a client instruction unit 416, which can be implemented in hardware, software, or both. In some implementations, the system 400 can include additional or different (or a combination of both) components not shown in the block diagram. In some implementations, components can also be omitted from the system 400.

The operation code generation unit 402 can, for example, generate an operation code, as discussed in FIG. 2. The transmitting unit 404 can, for example, transmit login information or an operation code, as discussed in FIGS. 1 and 3. The receiving unit 406 can, for example, receive a request to log in to a suspended account or a request to suspend an account, as discussed in FIGS. 1-2. The condition determination unit 408 can, for example, determine whether an operation code satisfies a predetermined condition, as discussed in FIG. 1. The error prompt unit 410 can, for example, generate an operation code error message, as discussed in FIG. 1. The account acquisition unit 412 can, for example, obtain a suspended account based on an operation code, as discussed in FIG. 1. The account login unit 414 can, for example, log in to a suspended account, as discussed in FIG. 1. The client instruction unit 416 can, for example, generate login information, as discussed in FIG. 1.

Figure 5:
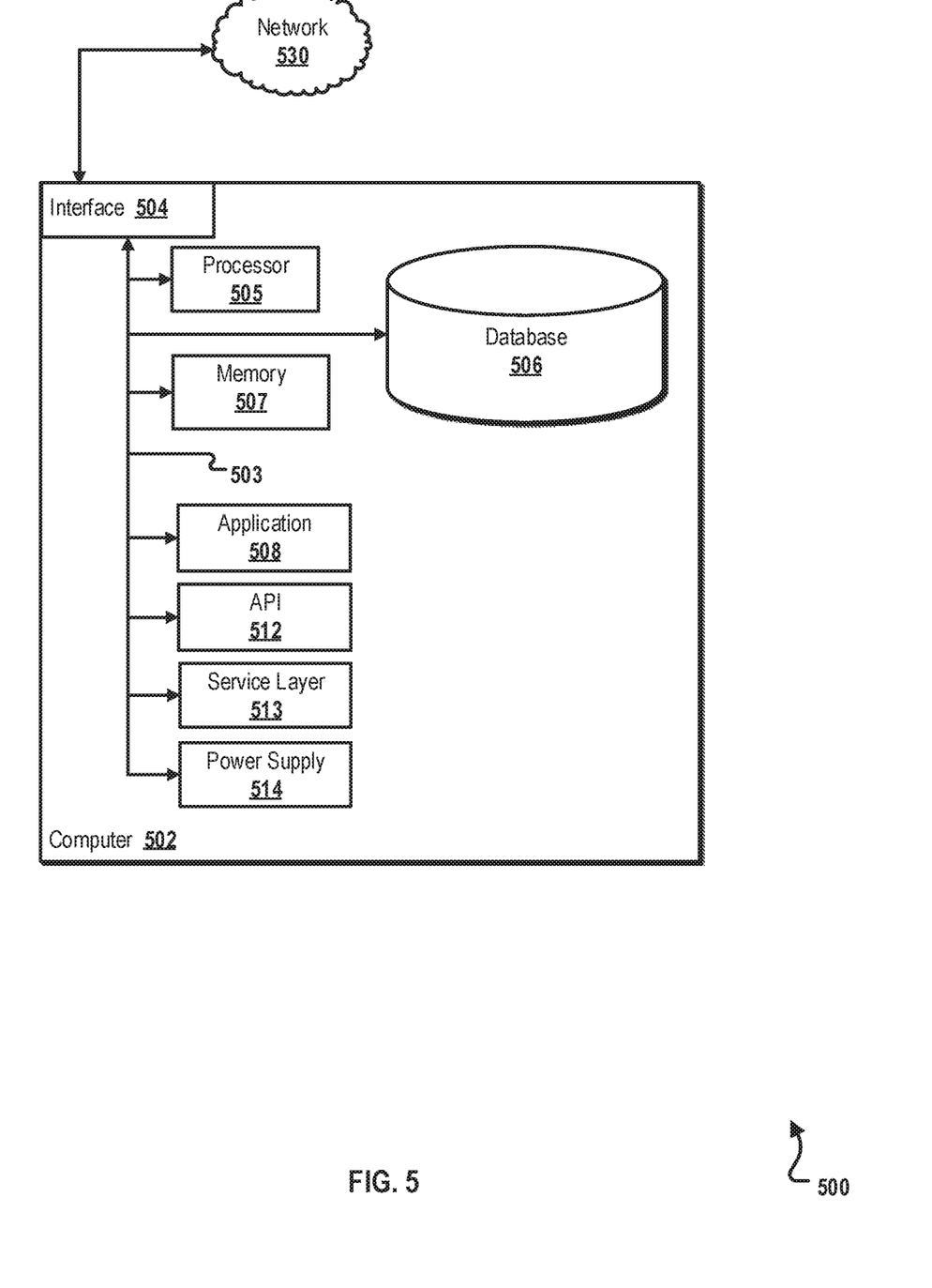
FIG. 5 is a block diagram illustrating an example of a computer-implemented system used to provide computational functionalities associated with described algorithms, methods, functions, processes, flows, and procedures, according to an implementation of the present disclosure.

FIG. 5 is a block diagram illustrating an example of a computer-implemented System 500 used to provide computational functionalities associated with described algorithms, methods, functions, processes, flows, and procedures, according to an implementation of the present disclosure. In the illustrated implementation, System 500 includes a Computer 502 and a Network 530.

The illustrated Computer 502 is intended to encompass any computing device such as a server, desktop computer, laptop/notebook computer, wireless data port, smart phone, personal data assistant (PDA), tablet computer, one or more processors within these devices, another computing device, or a combination of computing devices, including physical or virtual instances of the computing device, or a combination of physical or virtual instances of the computing device. Additionally, the Computer 502 can include an input device, such as a keypad, keyboard, touch screen, another input device, or a combination of input devices that can accept user information, and an output device that conveys information associated with the operation of the Computer 502, including digital data, visual, audio, another type of information, or a combination of types of information, on a graphical-type user interface (UI) (or GUI) or other UI.

The Computer 502 can serve in a role in a distributed computing system as a client, network component, a server, a database or another persistency, another role, or a combination of roles for performing the subject matter described in the present disclosure. The illustrated Computer 502 is communicably coupled with a Network 530. In some implementations, one or more components of the Computer 502 can be configured to operate within an environment, including cloud-computing-based, local, global, another environment, or a combination of environments.

At a high level, the Computer 502 is an electronic computing device operable to receive, transmit, process, store, or manage data and information associated with the described subject matter. According to some implementations, the Computer 502 can also include or be communicably coupled with a server, including an application server, e-mail server, web server, caching server, streaming data server, another server, or a combination of servers.

The Computer 502 can receive requests over Network 530 (for example, from a client software application executing on another Computer 502) and respond to the received requests by processing the received requests using a software application or a combination of software applications. In addition, requests can also be sent to the Computer 502 from internal users (for example, from a command console or by another internal access method), external or third-parties, or other entities, individuals, systems, or computers.

Each of the components of the Computer 502 can communicate using a System Bus 503. In some implementations, any or all of the components of the Computer 502, including hardware, software, or a combination of hardware and software, can interface over the System Bus 503 using an application programming interface (API) 512, a Service Layer 513, or a combination of the API 512 and Service Layer 513. The API 512 can include specifications for routines, data structures, and object classes. The API 512 can be either computer-language independent or dependent and refer to a complete interface, a single function, or even a set of APIs. The Service Layer 513 provides software services to the Computer 502 or other components (whether illustrated or not) that are communicably coupled to the Computer 502. The functionality of the Computer 502 can be accessible for all service consumers using the Service Layer 513. Software services, such as those provided by the Service Layer 513, provide reusable, defined functionalities through a defined interface. For example, the interface can be software written in JAVA, C++, another computing language, or a combination of computing languages providing data in extensible markup language (XML) format, another format, or a combination of formats. While illustrated as an integrated component of the Computer 502, alternative implementations can illustrate the API 512 or the Service Layer 513 as stand-alone components in relation to other components of the Computer 502 or other components (whether illustrated or not) that are communicably coupled to the Computer 502. Moreover, any or all parts of the API 512 or the Service Layer 513 can be implemented as a child or a sub-module of another software module, enterprise application, or hardware module without departing from the scope of the present disclosure.

The Computer 502 includes an Interface 504. Although illustrated as a single Interface 504, two or more Interfaces 504 can be used according to particular needs, desires, or particular implementations of the Computer 502. The Interface 504 is used by the Computer 502 for communicating with another computing system (whether illustrated or not) that is communicatively linked to the Network 530 in a distributed environment. Generally, the Interface 504 is operable to communicate with the Network 530 and includes logic encoded in software, hardware, or a combination of software and hardware. More specifically, the Interface 504 can include software supporting one or more communication protocols associated with communications such that the Network 530 or hardware of Interface 504 is operable to communicate physical signals within and outside of the illustrated Computer 502.

The Computer 502 includes a Processor 505. Although illustrated as a single Processor 505, two or more Processors 505 can be used according to particular needs, desires, or particular implementations of the Computer 502. Generally, the Processor 505 executes instructions and manipulates data to perform the operations of the Computer 502 and any algorithms, methods, functions, processes, flows, and procedures as described in the present disclosure.

The Computer 502 also includes a Database 506 that can hold data for the Computer 502, another component communicatively linked to the Network 530 (whether illustrated or not), or a combination of the Computer 502 and another component. For example, Database 506 can be an in-memory, conventional, or another type of database storing data consistent with the present disclosure. In some implementations, Database 506 can be a combination of two or more different database types (for example, a hybrid in-memory and conventional database) according to particular needs, desires, or particular implementations of the Computer 502 and the described functionality. Although illustrated as a single Database 506, two or more databases of similar or differing types can be used according to particular needs, desires, or particular implementations of the Computer 502 and the described functionality. While Database 506 is illustrated as an integral component of the Computer 502, in alternative implementations, Database 506 can be external to the Computer 502.

The Computer 502 also includes a Memory 507 that can hold data for the Computer 502, another component or components communicatively linked to the Network 530 (whether illustrated or not), or a combination of the Computer 502 and another component. Memory 507 can store any data consistent with the present disclosure. In some implementations, Memory 507 can be a combination of two or more different types of memory (for example, a combination of semiconductor and magnetic storage) according to particular needs, desires, or particular implementations of the Computer 502 and the described functionality. Although illustrated as a single Memory 507, two or more Memories 507 or similar or differing types can be used according to particular needs, desires, or particular implementations of the Computer 502 and the described functionality. While Memory 507 is illustrated as an integral component of the Computer 502, in alternative implementations, Memory 507 can be external to the Computer 502.

The Application 508 is an algorithmic software engine providing functionality according to particular needs, desires, or particular implementations of the Computer 502, particularly with respect to functionality described in the present disclosure. For example, Application 508 can serve as one or more components, modules, or applications. Further, although illustrated as a single Application 508, the Application 508 can be implemented as multiple Applications 508 on the Computer 502. In addition, although illustrated as integral to the Computer 502, in alternative implementations, the Application 508 can be external to the Computer 502.

The Computer 502 can also include a Power Supply 514. The Power Supply 514 can include a rechargeable or non-rechargeable battery that can be configured to be either user- or non-user-replaceable. In some implementations, the Power Supply 514 can include power-conversion or management circuits (including recharging, standby, or another power management functionality). In some implementations, the Power Supply 514 can include a power plug to allow the Computer 502 to be plugged into a wall socket or another power source to, for example, power the Computer 502 or recharge a rechargeable battery.

There can be any number of Computers 502 associated with, or external to, a computer system containing Computer 502, each Computer 502 communicating over Network 530. Further, the term "client," "user," or other appropriate terminology can be used interchangeably, as appropriate, without departing from the scope of the present disclosure. Moreover, the present disclosure contemplates that many users can use one Computer 502, or that one user can use multiple computers 502.

Described implementations of the subject matter can include one or more features, alone or in combination.

For example, in a first implementation, a computer-implemented method, comprising: receiving a first request to log in to a suspended account, wherein the first request includes an operation code; determining that the operation code satisfies a predetermined condition; and in response to the determination: obtaining the suspended account based on the operation code; and logging in to the suspended account.

The foregoing and other described implementations can each, optionally, include one or more of the following features:

A first feature, combinable with any of the following features, wherein before receiving the first request the method further comprises: receiving a second request to suspend the account, wherein the second request includes an account number associated with the account; and in response to receiving the second request: suspending the account based on the account number; and generating the operation code based on the account number, wherein the operation code uniquely identifies the account number.

A second feature, combinable with any of the previous or following features, further comprising: obtaining a contact address associated with the account based on the account number, wherein the contact address includes at least one of a cell phone number, an email address, or an instant messaging account; and transmitting the generated operation code to the contact address.

A third feature, combinable with any of the previous or following features, further comprising storing the generated operation code in an operation code table.

A fourth feature, combinable with any of the previous or following features, wherein the predetermined condition includes that the operation code is in the operation code table.

A fifth feature, combinable with any of the previous or following features, wherein the account number is stored in the operation code table, and obtaining the suspended account comprises querying the operation table to obtain the account number based on the operation code.

A sixth feature, combinable with any of the previous or following features, wherein the predetermined condition includes that a number of the operation code being used to log in to the suspended account is less than a predetermined number.

A seventh feature, combinable with any of the previous or following features, wherein the operation code includes at least one of a random number, a bar code, or a Quick Response (QR) code.

An eighth feature, combinable with any of the previous or following features, wherein the first request is received by a server and from a device, and after logging in to the suspended account the method further comprises: generating, by the server, login information associated with logging in to the suspended account; and transmitting, by the server, the generated login information to the device.

In a second implementation, a non-transitory, computer-readable medium storing one or more instructions executable by a computer system to perform operations comprising: receiving a first request to log in to a suspended account, wherein the first request includes an operation code; determining that the operation code satisfies a predetermined condition; and in response to the determination: obtaining the suspended account based on the operation code; and logging in to the suspended account.

The foregoing and other described implementations can each, optionally, include one or more of the following features:

A first feature, combinable with any of the following features, wherein before receiving the first request the operations further comprise: receiving a second request to suspend the account, wherein the second request includes an account number associated with the account; and in response to receiving the second request: suspending the account based on the account number; and generating the operation code based on the account number, wherein the operation code uniquely identifies the account number.

A second feature, combinable with any of the previous or following features, further comprising: obtaining a contact address associated with the account based on the account number, wherein the contact address includes at least one of a cell phone number, an email address, or an instant messaging account; and transmitting the generated operation code to the contact address.

A third feature, combinable with any of the previous or following features, further comprising storing the generated operation code in an operation code table.

A fourth feature, combinable with any of the previous or following features, wherein the predetermined condition includes that the operation code is in the operation code table.

A fifth feature, combinable with any of the previous or following features, wherein the account number is stored in the operation code table, and obtaining the suspended account comprises querying the operation table to obtain the account number based on the operation code.

A sixth feature, combinable with any of the previous or following features, wherein the predetermined condition includes that a number of the operation code being used to log in to the suspended account is less than a predetermined number.

A seventh feature, combinable with any of the previous or following features, wherein the operation code includes at least one of a random number, a bar code, or a Quick Response (QR) code.

An eighth feature, combinable with any of the previous or following features, wherein the first request is received by a server and from a device, and after logging in to the suspended account the operations further comprise: generating, by the server, login information associated with logging in to the suspended account; and transmitting, by the server, the generated login information to the device.

In a third implementation, a computer-implemented system, comprising: one or more computers; and one or more computer memory devices interoperably coupled with the one or more computers and having tangible, non-transitory, machine-readable media storing instructions that, when executed by the one or more computers, perform operations comprising: receiving a first request to log in to a suspended account, wherein the first request includes an operation code; determining that the operation code satisfies a predetermined condition; and in response to the determination: obtaining the suspended account based on the operation code; and logging in to the suspended account.

The foregoing and other described implementations can each, optionally, include one or more of the following features:

A first feature, combinable with any of the following features, wherein before receiving the first request the operations further comprise: receiving a second request to suspend the account, wherein the second request includes an account number associated with the account; and in response to receiving the second request: suspending the account based on the account number; and generating the operation code based on the account number, wherein the operation code uniquely identifies the account number.

A second feature, combinable with any of the previous or following features, further comprising: obtaining a contact address associated with the account based on the account number, wherein the contact address includes at least one of a cell phone number, an email address, or an instant messaging account; and transmitting the generated operation code to the contact address.

A third feature, combinable with any of the previous or following features, further comprising storing the generated operation code in an operation code table.

A fourth feature, combinable with any of the previous or following features, wherein the predetermined condition includes that the operation code is in the operation code table.

A fifth feature, combinable with any of the previous or following features, wherein the account number is stored in the operation code table, and obtaining the suspended account comprises querying the operation table to obtain the account number based on the operation code.

A sixth feature, combinable with any of the previous or following features, wherein the predetermined condition includes that a number of the operation code being used to log in to the suspended account is less than a predetermined number.

A seventh feature, combinable with any of the previous or following features, wherein the operation code includes at least one of a random number, a bar code, or a Quick Response (QR) code.

An eighth feature, combinable with any of the previous or following features, wherein the first request is received by a server and from a device, and after logging in to the suspended account the operations further comprise: generating, by the server, login information associated with logging in to the suspended account; and transmitting, by the server, the generated login information to the device.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable medium for execution by, or to control the operation of, a computer or computer-implemented system. Alternatively, or additionally, the program instructions can be encoded in/on an artificially generated propagated signal, for example, a machine-generated electrical, optical, or electromagnetic signal that is generated to encode information for transmission to a receiver apparatus for execution by a computer or computer-implemented system. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second (s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or an equivalent term as understood by one of ordinary skill in the art) refer to data processing hardware and encompass all kinds of apparatuses, devices, and machines for processing data, including by way of example, a programmable processor, a computer, or multiple processors or computers. The computer can also be, or further include special purpose logic circuitry, for example, a central processing unit (CPU), an FPGA (field programmable gate array), or an ASIC (application-specific integrated circuit). In some implementations, the computer or computer-implemented system or special purpose logic circuitry (or a combination of the computer or computer-implemented system and special purpose logic circuitry) can be hardware- or software-based (or a combination of both hardware- and software-based). The computer can optionally include code that creates an execution environment for computer programs, for example, code that constitutes processor firmware, a protocol stack, a database management system, an operating system, or a combination of execution environments. The present disclosure contemplates the use of a computer or computer-implemented system with an operating system of some type, for example LINUX, UNIX, WINDOWS, MAC OS, ANDROID, IOS, another operating system, or a combination of operating systems.

A computer program, which can also be referred to or described as a program, software, a software application, a unit, a module, a software module, a script, code, or other component can be written in any form of programming language, including compiled or interpreted languages, or declarative or procedural languages, and it can be deployed in any form, including, for example, as a stand-alone program, module, component, or subroutine, for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures can be illustrated as individual components, such as units or modules, that implement described features and functionality using various objects, methods, or other processes, the programs can instead include a number of sub-units, sub-modules, third-party services, components, libraries, and other components, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and computers can also be implemented as, special purpose logic circuitry, for example, a CPU, an FPGA, or an ASIC.

Computers for the execution of a computer program can be based on general or special purpose microprocessors, both, or another type of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device.

Non-transitory computer-readable media for storing computer program instructions and data can include all forms of permanent/non-permanent or volatile/non-volatile memory, media and memory devices, including by way of example semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices; magnetic devices, for example, tape, cartridges, cassettes, internal/removable disks; magneto-optical disks; and optical memory devices, for example, digital versatile/video disc (DVD), compact disc (CD)-ROM, DVD+/−R, DVD-RAM, DVD-ROM, high-definition/density (HD)-DVD, and BLU-RAY/BLU-RAY DISC (BD), and other optical memory technologies. The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security or access data, or reporting files. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity, a multi-touch screen using capacitive or electric sensing, or another type of touchscreen. Other types of devices can be used to interact with the user. For example, feedback provided to the user can be any form of sensory feedback (such as, visual, auditory, tactile, or a combination of feedback types). Input from the user can be received in any form, including acoustic, speech, or tactile input. In addition, a computer can interact with the user by sending documents to and receiving documents from a client computing device that is used by the user (for example, by sending web pages to a web browser on a user's mobile computing device in response to requests received from the web browser).

The term "graphical user interface," or "GUI," can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a number of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with the present disclosure), all or a portion of the Internet, another communication network, or a combination of communication networks. The communication network can communicate with, for example, Internet Protocol (IP) packets, Frame Relay frames, Asynchronous Transfer Mode (ATM) cells, voice, video, data, or other information between network nodes.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventive concept or on the scope of what can be claimed, but rather as descriptions of features that can be specific to particular implementations of particular inventive concepts. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A method for loss reported account acquisition, comprising:
  acquiring a loss reported account by:
    performing a loss report for an account on a network server, wherein performing the loss report includes:
      obtaining an account loss report request at the network server, the account loss report request comprising an account name of the loss reported account;
      deactivating logging into the loss reported account based on inputting the account name and a password during a period of time, the loss reported account being registered with the account name and the password;
      generating an operation code according to the account name of the loss reported account, wherein the operation code includes a bar code or a Quick Response (QR) code;
      obtaining a user contact address associated with the loss reported account corresponding to the account name; and
      sending the operation code to the user contact address;
    receiving a login request at the network server from a client terminal, the login request comprising the operation code correlated with the loss reported account;
    determining, at the network server, that the operation code meets a preset condition, wherein determining that the operation code meets the preset condition further comprises determining that a number of times the operation code is used is within a preset threshold of a number of times, and wherein the preset threshold is defined by a user of the loss reported account and is more than one;
    acquiring a predetermined access right associated with the loss reported account according to the operation code, wherein the predetermined access right is defined by the user of the loss reported account from a plurality of access rights, and wherein the plurality of access rights include a right to unsuspend account and a right to check account; and logging in to the loss reported account with the predetermined access right on the network server during the period of time.

2. The method of claim 1, further comprising:
generating account login information for the loss reported account; and
providing the account login information to the client terminal.

3. The method of claim 2, further comprising:
at the client terminal, acquiring the account login information; and
logging-in loss reported account at the client terminal for user interaction.

4. The method of claim 3, further comprising:
at the client terminal, providing an operation code input window for receiving the operation code; and
transmitting the operation code to the network server in a login request containing the operation code.

5. The method of claim 4, wherein acquiring the loss reported account corresponding to the operation code comprises:
obtaining a corresponding account name by either:
querying an account name table according to the operation code, wherein the account name table includes registered account names of accounts of the network server and corresponding operation codes; or
reversely performing a preset algorithm on the operation code to obtain a corresponding loss reported account.

6. The method of claim 1, wherein the user contact address comprises at least one of a user mobile phone number, a user email address, and a user instant messaging account.

7. The method of claim 1, wherein generating the operation code according to the account name comprises:
converting the account name according to a preset algorithm to obtain the operation code, wherein the operation code is uniquely defined in an online transaction platform of the network server.

8. The method of claim 7, wherein the preset algorithm is performed when generating the operation code according to the account name.

9. The method of claim 1, wherein after generating the operation code according to the account name, the method further comprises:
storing the operation code in a preset operation code table.

10. The method of claim 1, further comprising:
receiving, at the network server, a query request including the account name of the loss reported account;
based on the account name, obtaining the operation code for the loss reported account; and
providing the operation code to a user of the client terminal.

11. The method of claim 1, wherein the preset condition comprises:
the operation code being in a preset operation code table.

12. The method of claim 1, wherein the operation code includes the QR code, and wherein receiving the login request at the network server from the client terminal comprises receiving an image of the QR code uploaded by a user of the client terminal.

13. The method of claim 1, wherein the account loss report request is obtained by receiving a call from the user.

14. A computer-implemented system for loss reported account acquisition, comprising:
one or more computers; and
one or more computer memory devices interoperably coupled with the one or more computers and having tangible, non-transitory, machine-readable media storing instructions that, when executed by the one or more computers, perform operations comprising:
acquiring a loss reported account by:
performing a loss report for an account on a network server, wherein performing the loss report includes:
obtaining an account loss report request at the network server, the account loss report request comprising an account name of the loss reported account;
deactivating logging into the loss reported account based on inputting the account name and a password during a period of time, the loss reported account being registered with the account name and the password;
generating an operation code according to the account name of the loss reported account, wherein the operation code includes a bar code or a Quick Response (QR) code;
obtaining a user contact address associated with the loss reported account corresponding to the account name; and
sending the operation code to the user contact address;
receiving a login request at the network server from a client terminal, the login request comprising the operation code correlated with the loss reported account;
determining, at the network server, that the operation code meets a preset condition, wherein determining that the operation code meets the preset condition further comprises determining that a number of times the operation code is used is within a preset threshold of a number of times, and wherein the preset threshold is defined by a user of the loss reported account and is more than one;
acquiring a predetermined access right associated with the loss reported account according to the operation code, wherein the predetermined access right is defined by the user of the loss reported account from a plurality of access rights, and wherein the plurality of access rights include a right to unsuspend account and a right to check account; and
logging in to the loss reported account with the predetermined access right on the network server during the period of time.

15. The computer-implemented system of claim 14, further comprising:
generating account login information for the loss reported account; and
providing the account login information to the client terminal.

16. The computer-implemented system of claim 15, further comprising:
at the client terminal, acquiring the account login information; and
logging-in loss reported account at the client terminal for user interaction.

17. The computer-implemented system of claim 16, further comprising:

at the client terminal, providing an operation code input window for receiving the operation code; and transmitting the operation code to the network server in a login request containing the operation code.

18. The computer-implemented system of claim 14, wherein the user contact address comprises at least one of a user mobile phone number, a user email address, and a user instant messaging account.

\* \* \* \* \*

UNITED STATES PATENT AND TRADEMARK OFFICE
CERTIFICATE OF CORRECTION

PATENT NO. : 11,030,296 B2
APPLICATION NO. : 15/842531
DATED : June 8, 2021
INVENTOR(S) : Jianbo Qian It is certified that error appears in the above-identified patent and that said Letters Patent is hereby corrected as shown below:

On the Title Page

Column 1, Line 1, (Applicant), delete "Alibaba Group Holding Limited," and insert -- Advanced New Technologies Co., Ltd., --.

Signed and Sealed this
Twenty-third Day of May, 2023

Katherine Kelly Vidal
*Director of the United States Patent and Trademark Office*